(12) United States Patent
Washio (10) Patent No.: US 12,001,123 B2
(45) Date of Patent: Jun. 4, 2024

(54) OPTICAL MEMBER DRIVING DEVICE, CAMERA DEVICE, AND ELECTRONIC APPARATUS

(71) Applicant: New Shicoh Motor Co., LTD, Zhejiang (CN)

(72) Inventor: Noriyuki Washio, Yamato (JP)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 589 days.

(21) Appl. No.: 17/343,213

(22) Filed: Jun. 9, 2021

(65) Prior Publication Data
US 2022/0004084 A1 Jan. 6, 2022

(30) Foreign Application Priority Data
Jul. 3, 2020 (CN) .......................... 202010631055.8

(51) Int. Cl.
*G03B 5/00* (2021.01)
*G03B 17/02* (2021.01)
*G03B 17/17* (2021.01)

(52) U.S. Cl.
CPC .............. *G03B 17/02* (2013.01); *G03B 5/00* (2013.01); *G03B 17/17* (2013.01); *G03B 2205/003* (2013.01); *G03B 2205/0053* (2013.01)

(58) Field of Classification Search
CPC .............. G03B 17/17; G03B 2205/003; G03B 2205/0053; G03B 5/00; G03B 2205/0069; H04N 23/686
See application file for complete search history.

(56) References Cited

FOREIGN PATENT DOCUMENTS

| CN | 104280976 A | * | 1/2015 | ......... G02B 26/0816 |
| CN | 205942054 U | | 2/2017 | |
| JP | 2010144843 A | | 7/2010 | |
| JP | 2016048295 A | | 4/2016 | |
| JP | 2018205683 A | | 12/2018 | |
| JP | 6635397 B1 | | 1/2020 | |
| JP | 2021182125 A | | 11/2021 | |
| TW | 202307545 A | * | 2/2023 | ............... G02B 7/04 |

* cited by examiner

*Primary Examiner* — Christopher E Mahoney (57) ABSTRACT

According to an aspect of the present disclosure, an optical member driving device is provided. The device includes a fixed portion, a pivoting portion with a holding portion for holding the optical member, a pivot shaft, a driving portion, and a pivot suppressing portion. The pivot suppressing portion has a first magnet at the pivoting portion, and a second magnet at the fixed portion. The first magnet and the second magnet are disposed in such a manner that the same magnetic poles face each other in the pivoting direction.

12 Claims, 7 Drawing Sheets

OPTICAL MEMBER DRIVING DEVICE, CAMERA DEVICE, AND ELECTRONIC APPARATUS

CROSS-REFERENCE TO RELATED APPLICATION

This application claims the benefit of Chinese patent application CN202010631055.8, filed on Jul. 3, 2020, the contents of which are incorporated herein by reference.

TECHNICAL FIELD

The present disclosure relates to an optical member driving device used in electronic apparatus such as smartphones, a camera device, and an electronic apparatus.

BACKGROUND

In a camera device mounted within an electronic apparatus such as a smartphone, there is a prism for correcting image blur and a member holding the prism in a rockable manner, and a configuration in which light from a subject is guided to an imaging surface of the camera after being reflected by the prism. A document disclosing a technique related to this type of camera device is CN 205942054U (hereinafter referred to as "Patent Document 1"). A periscopic imaging module described in Patent Document 1 has a housing, a prism, a prism pedestal on which the prism is placed, a pivot shaft inserted into the shaft hole of the prism pedestal, a driving magnet provided on the lower surface of the prism pedestal, and a coil provided at a position facing the driving magnet in the lower plate of the housing, and drives the prism pedestal around the pivot shaft by the driving force generated by the magnet and the coil. In this periscopic imaging module, a yoke is embedded on the lower side of the coil in the lower plate of the housing, and the excessive pivotal movement of the prism pedestal is suppressed by the attractive force between the yoke and the driving magnet.

SUMMARY

However, in the case of the technology of Patent Document 1, there is a problem that the larger the amount of the pivotal movement of the prism pedestal, the smaller the suppression force.

In view of this problem, one of objects of the present disclosure is to provide an optical member driving device, which can reliably prevent the excessive pivotal movement of the pivoting portion on which the optical member is mounted.

In order to solve the above problem, and according to a first aspect of the present disclosure, there is provided an optical member driving device including: a fixed portion, a pivoting portion with a holding portion for holding the optical member, a pivot shaft, a driving portion, and a pivot suppressing portion. The pivot suppressing portion has a first magnet provided at the pivoting portion, and a second magnet provided at the fixed portion. The first magnet and the second magnet are disposed in such a manner that the same magnetic poles face each other in the turning direction.

According to a second aspect of the present disclosure, there is provided a camera device including the optical member driving device described above.

According to a third aspect of the present disclosure, there is provided an electronic apparatus including the camera device described above.

DETAILED DESCRIPTION

First Embodiment

Figure 1:
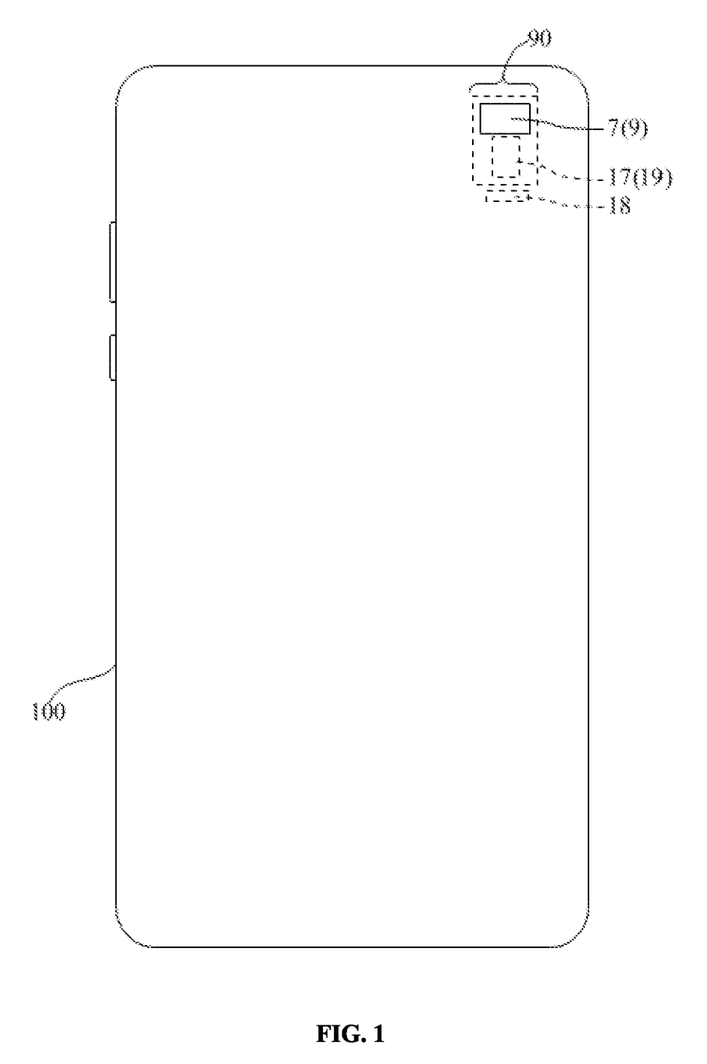
FIG. 1 is a front view of a smartphone on which a camera device is mounted, the camera device including an optical member driving device according to a first embodiment of the present disclosure.
Figure 2:
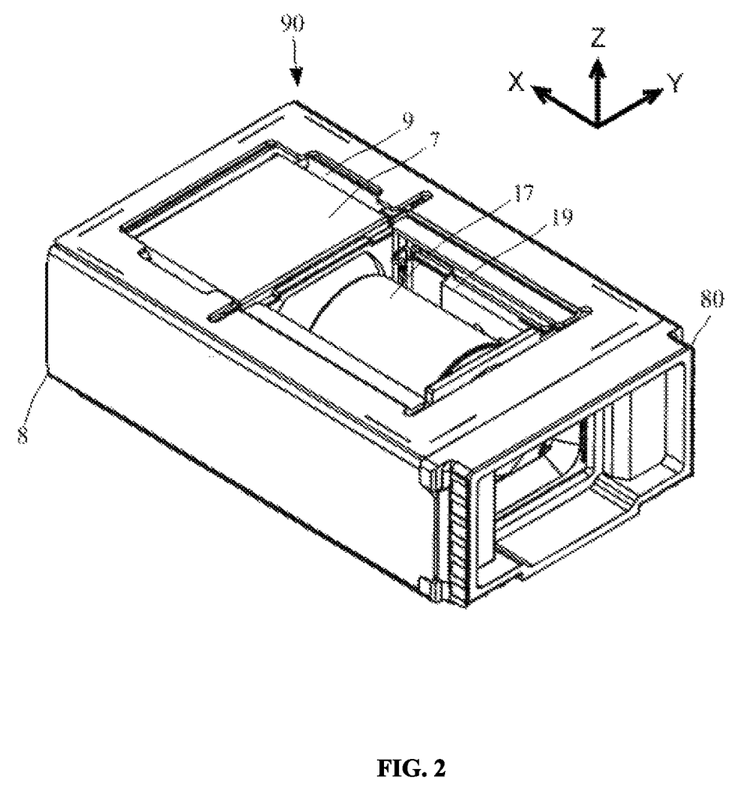
FIG. 2 is a perspective view of the camera device of FIG. 1.
Figure 3A:
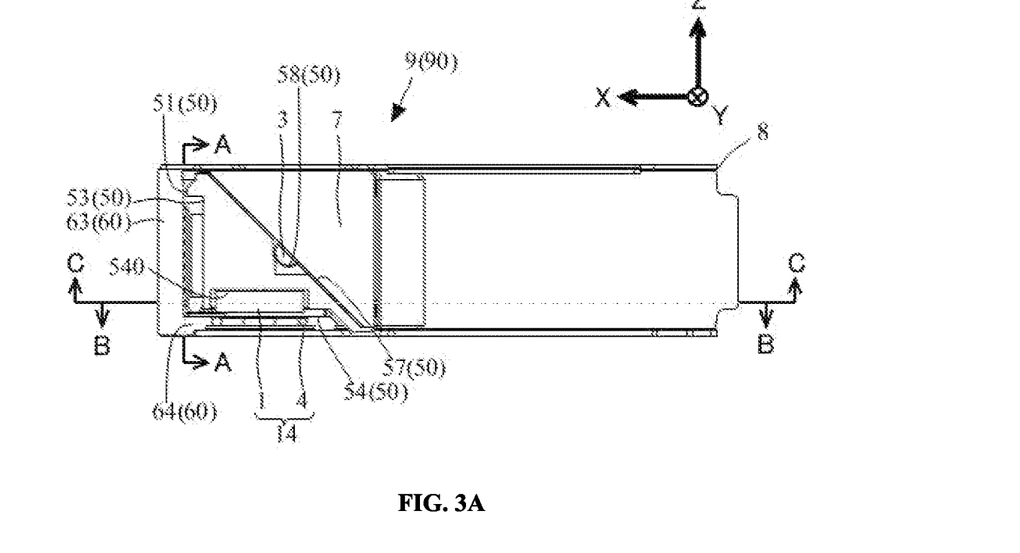
FIG. 3A is a cross-sectional view of a cut plane parallel to an XZ plane passing through the center in a Y direction of a case, a prism, and the optical member driving device of FIG. 2.
Figure 3B:
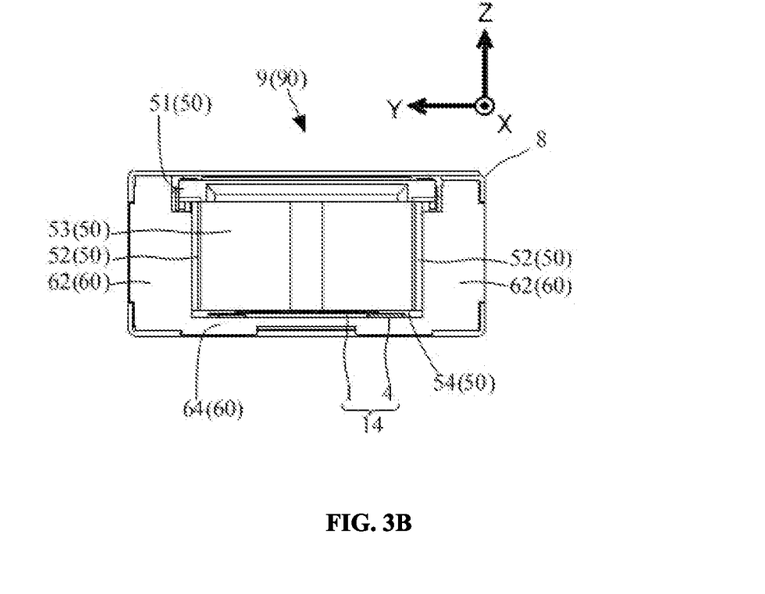
FIG. 3B is a cross-sectional view along line A-A of FIG. 3A.
Figure 4A:
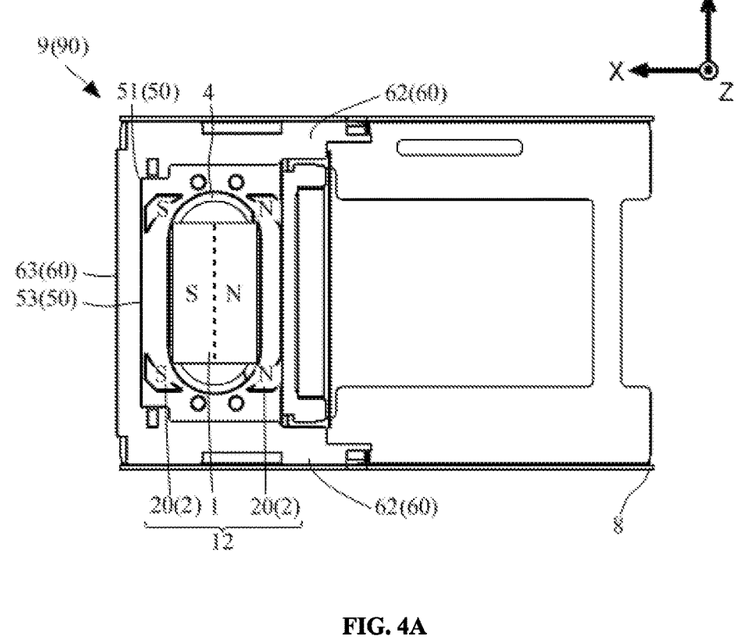
FIG. 4A is a cross-sectional view along line B-B of FIG. 3A.
Figure 4B:
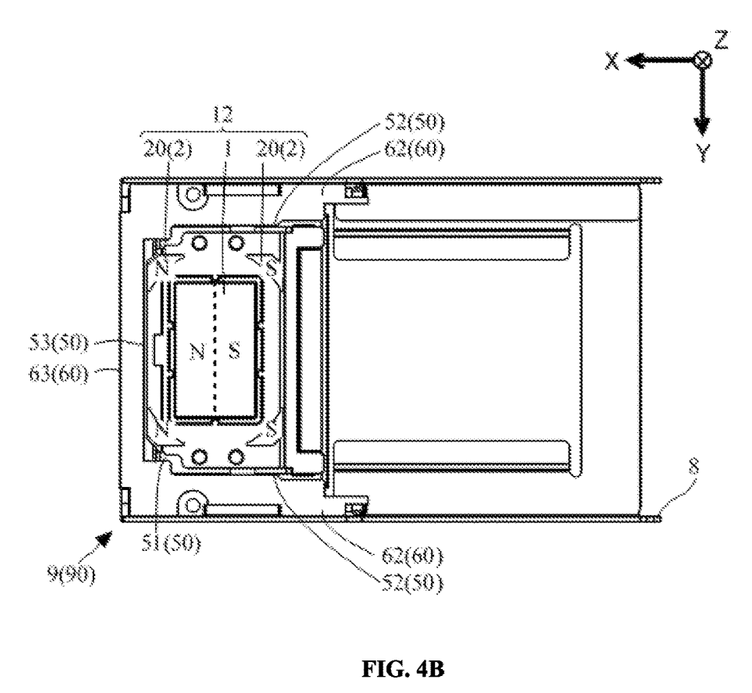
FIG. 4B is a cross-sectional view along line C-C of FIG. 3A.

Hereinafter, the first embodiment of the present disclosure is explained with reference to drawings. As shown in FIG. 1 and FIG. 2, a camera device 90 including an optical member driving device 9 according to the first embodiment of the present disclosure is housed in a housing of a smartphone 100.

The camera device 90 has an image sensor 18, a prism 7 which is an optical member reflecting the light incident from a subject, a lens body 17 which is an optical member guiding the light reflected by the prism 7 to the image sensor 18, an optical member driving device 9 driving the prism 7, a second optical member driving device 19 driving the lens body 17, and a case 8 on which these members are mounted.

Hereinafter, one direction in which the light from the subject is incident on the prism 7 is appropriately referred to as a Z-direction. Further, one direction in which the light reflected by the prism 7 is directed toward the lens body 17 is appropriately referred to as an X-direction, and a direction orthogonal to both the Z-direction and the X-direction is appropriately referred to as a Y-direction. Further, in the Z-direction, the side of the subject viewed from the prism 7 may be referred to as a front side, and the opposite side thereof may be referred to as the rear side. Further, in the X-direction, the side of the prism 7 viewed from the lens body 17 may be referred to as an upper side, and the image sensor 18 side, which is the opposite side, may be referred to as a lower side.

The case 8 of the camera device 90 has a hollow rectangular parallelepiped shape. The prism 7 and the optical member driving device 9 holding the prism 7, and the lens body 17 and the second optical member driving device 19 holding the lens body 17 are accommodated in the space inside the case 8 side by side in the X-direction. There are rectangular openings on the lower side, the upper side, and the front side of the case 8. A base 80 is fitted into an opening on the lower side of the case 8. The image sensor 18 is fixed to the base 80 with its light receiving surface facing the lens body 17.

As shown in FIG. 3A to FIG. 4B, the optical member driving device 9 has a pivoting portion 50, a fixed portion 60, a pivot shaft 3, a coil 4, a first magnet 1, and a second magnet 2. The second magnet 2 has four magnet pieces 20. Among these portions, the coil 4 and the first magnet 1 form a driving portion 14 that generates a driving force of the pivoting portion 50, the first magnet 1 and the second magnet 2 form a pivot suppressing portion 12 that suppresses excessive pivotal movement of the pivoting portion 50.

The fixed portion 60 has two side plates 62 facing each other in the Y-direction, and an upper plate 63 and a rear plate 64 interposed between the two side plates 62. The upper plate 63 of the fixed portion 60 is exposed to the outer side from the opening of the upper side of the case 8.

The pivoting portion 50 and the pivot shaft 3 are integrated and accommodated in the fixed portion 60. The pivot shaft 3 has a shape as if a portion thereof is notched from a slenderly cylindrical shape extending in the Y-direction, with the portion occupying the center of the slenderly cylindrical shape in the extending direction remained in a semi-cylindrical shape.

The pivoting portion 50 has a shape as if a triangular prism-shaped portion occupying approximately half of a rectangular parallelepiped extending in the Y-direction except for both end portions thereof is notched from the rectangular parallelepiped. The pivoting portion 50 includes: a solid portion 51, which is in a right-angled isosceles triangular prism shape; and two side wall portions 52, which are in a right-angled isosceles triangular shape at both end portions in the Y-direction and face each other in the Y-direction. The two side wall portions 52 are provided with circular through holes. The solid portion 51 of the pivoting portion 50 corresponds to the bottom of the right triangle, has a holding portion 57 facing the front lower side direction. A semi-circular depression 58 is provided successively from the through hole in the center of the holding portion 57.

The semi-cylindrical portion of the pivot shaft 3 is accommodated and adhesively fixed in the depression 58 of the holding portion 57. The cylindrical portions of both ends of the pivot shaft 3 are inserted into bearings of side plates 62 on the outer side of the side wall portions 52 through the through holes of the side wall portions 52. The portions of the pivot shaft 3 inside the through holes are adhesively fixed to the inner circumferences of the through holes. The holding portion 57 is provided with a mounting surface protruding slightly, the reflecting surface of the prism 7 is mounted on this mounting surface and adhesively fixed to the side wall portion 52, and the prism 7 is held by the holding portion 57. At this time, the holding portion 57 and the pivot shaft 3 other than the mounting surface are not in contact with the reflecting surface. The pivoting portion 50, the prism 7, and the pivot shaft 3 may pivot on the pivot shaft 3 with respect to the fixed portion 60. The pivoting direction on which the pivot shaft 3 pivots can be considered as the X-direction.

A recess portion 540 is provided on the rear surface 54 of the pivoting portion 50. The first magnet 1 is accommodated in the recess portion 540. The first magnet 1 is magnetized in the plate thickness direction, and the magnetization orientation is reversed between the upper side and the lower side in the X-direction. For example, the lower side and the upper side of the plate surface on the front side of the first magnet 1 are magnetized into the N-pole and the S-pole, and the lower side and the upper side of the plate surface on the rear side are magnetized into the S-pole and the N-pole.

The rear plate 64 of the fixed portion 60 is provided with a coil 4, and four magnet pieces 20 of the second magnet 2. The coil 4 faces the first magnet 1 with a slight gap sandwiched therebetween.

The four magnet pieces 20 of the second magnet 2 are disposed in such a way that in the pivoting direction of the pivoting portion 50, the same magnetic poles as the first magnet 1 face each other with the first magnet 1 being sandwiched therebetween from both sides. In addition, these are disposed in such a way that even in the extending direction of the pivot shaft 3, the same magnetic poles as the first magnet 1 face each other with the first magnet 1 being sandwiched therebetween from both sides. Specifically, the four magnet pieces 20 of the second magnet 2 sandwich the first magnet 1 therebetween from both sides, and are disposed at respective positions away from each other in a direction inclined with respect to both the pivoting direction of the pivoting portion 50 and the extending direction of the pivot shaft 3. Then the first magnet 1 and the four magnet pieces 20 of the second magnet 2 are disposed in such a way that the same magnetic poles face each other in the pivoting direction. That is, among the four magnet pieces 20, two magnet pieces 20 facing the first magnet 1 on the upper side are magnetized so that the front side is the S-pole and the rear side is the N-pole, and two magnet pieces 20 facing the first magnet 1 on the lower side are magnetized so that the front side is the N-pole and the rear side is the S-pole. In this case, in fact, on the upper side, surfaces changing from the S-pole to the N-pole from the front side to the rear side face each other, and, on the lower side, surfaces changing from the N-pole to the S-pole from the front side to the rear side face each other.

The above is the details of the configuration of the first embodiment. The optical member driving device 9 in the first embodiment includes a fixed portion 60, a pivoting portion 50 with a holding portion 57 for holding the prism 7 which is an optical member, a pivot shaft 3, a driving portion 14, and a pivot suppressing portion 12. Then, the pivot suppressing portion 12 has a first magnet 1 provided at the pivoting portion 50 and a second magnet 2 provided at the fixed portion 60. The first magnet 1 and the second magnet 2 are disposed so that the same magnetic poles face each other in the pivoting direction. Therefore, when a current is made to flow in the coil 4, and the pivot shaft 3, and the pivoting portion 50 and prism 7 supported by the pivot shaft 3 rotate, the repulsive force is strengthened on the side where the distance between the first magnet 1 and the magnet piece 20 of the second magnet 2 is shortened, and the excessive pivotal movement of the pivoting portion 50 is suppressed. When the current flowing in the coil 4 is cut off, the pivoting portion 50 returns to the initial position where the repulsive force between the first magnet 1 and the two magnet pieces 20 is balanced. Therefore, it is possible to provide an optical member driving device 9 which can reliably prevent the pivoting portion 50 on which the optical member is mounted from pivoting excessively. Further, even in the axial direction of the pivot shaft 3, even if the pivoting portion 50 moves in the axial direction, the repulsive force similar to the pivoting direction works, so that the pivoting portion 50 is suppressed from moving excessively, and always attempts to maintain the central position in the axial direction.

Second Embodiment

Next, the second embodiment of the present disclosure is described. In the above-mentioned first embodiment, the rear plate 64 of the fixed portion 60 is provided with the second magnet 2, the first magnet 1 also serves as the pivot suppressing portion 12 for suppressing the excessive pivotal movement of the pivoting portion 50 together with the second magnet 2, and as the driving magnet for generating a driving force of the pivoting portion 50 together with the coil 4. On the other hand, the second embodiment uses the first magnet 1A as a magnet different from the driving magnet.

Figure 5:
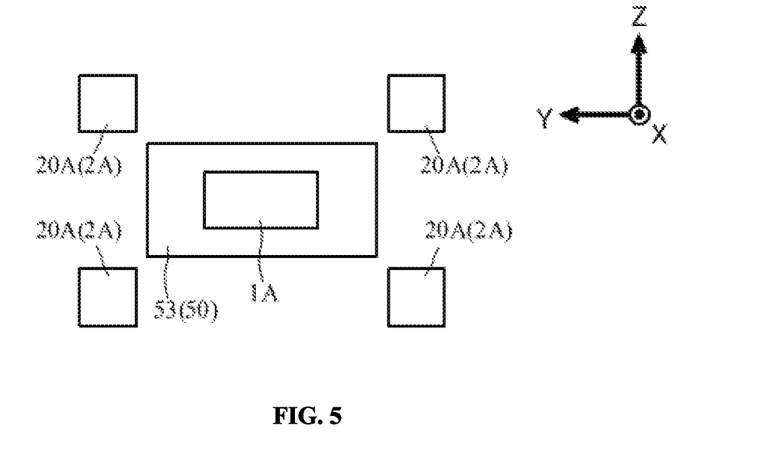
FIG. 5 is a diagram showing the configuration of a first magnet and a second magnet in an optical member driving device according to a second embodiment of the present disclosure.

As shown in FIG. 5, in the optical member driving device 9 of the second embodiment, there is a first magnet 1A in the center of the upper surface 53 of the pivoting portion 50, and four magnet pieces 20A of the second magnet 2A at positions sandwiching the first magnet 1A in the fixed portion 60 and being separated on the +Y+Z side, the +Y−Z side, the −Y+Z side, and the −Y−Z side. The pivoting direction can be considered as the Z-direction. The same effect as the above-mentioned first embodiment can also be obtained according to the second embodiment.

Third Embodiment

Figure 6:
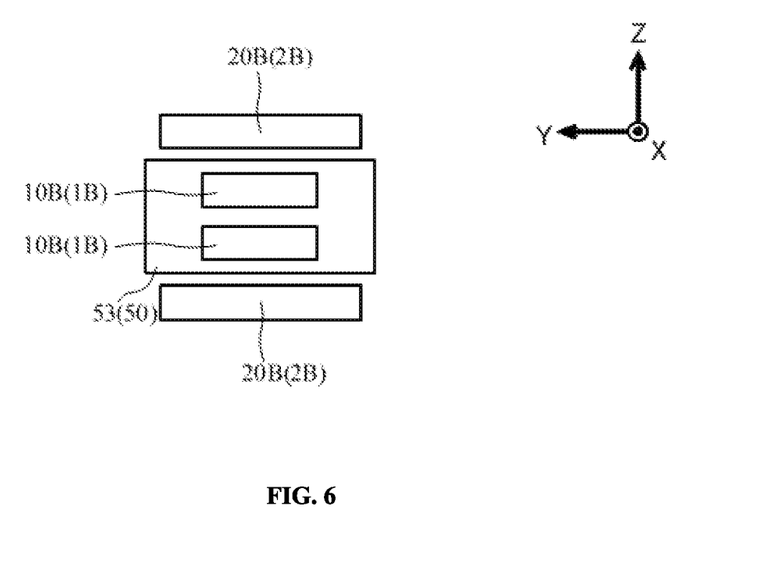
FIG. 6 is a diagram showing the configuration of a first magnet and a second magnet in an optical member driving device according to a third embodiment of the present disclosure.

Next, the third embodiment of the present disclosure is described. As shown in FIG. 6, in the optical member driving device 9 of the third embodiment, the first magnet 1B has two magnet pieces 10B. Then, one magnet piece 10B of the first magnet 1B and one magnet piece 20B of the second magnet 2B, and the other magnet piece 10B of the first magnet 1B and the other magnet piece 20B of the second magnet 2B are located at positions separated in the Z-direction which is the pivoting direction, respectively. In other words, the first magnet 1 and the second magnet 2 are arranged in the pivoting direction. That is, the magnet piece 10B and the magnet piece 20B are disposed in such a way that the same magnetic poles face each other in the pivoting direction. At this time, the length of the magnet piece 20B arranged on the outer side is set to be longer than the length of the magnet piece 10B arranged on the inner side. And it is desirable that even if the magnet piece 10B moves in the axial direction, it does not go beyond the end portion of the magnet piece 20B. Regardless of the movement of the pivoting portion 50 in the extending direction of the pivot shaft 3, the shorter first magnet 1 is entirely facing the longer second magnet 2. Thereby, a repulsive force that always attempts to maintain the central position is applied to the magnet piece 10B even in the axial direction. The same applies when the relation between the length of the magnet piece 10B and the length of the magnet piece 20B are reversed. According to the present embodiment, the movements in the pivoting direction of the pivoting portion 50 and the extending direction of the pivot shaft 3 are suppressed by the repulsive force between the magnet piece 10B and the magnet piece 20B.

Fourth Embodiment

Figure 7:
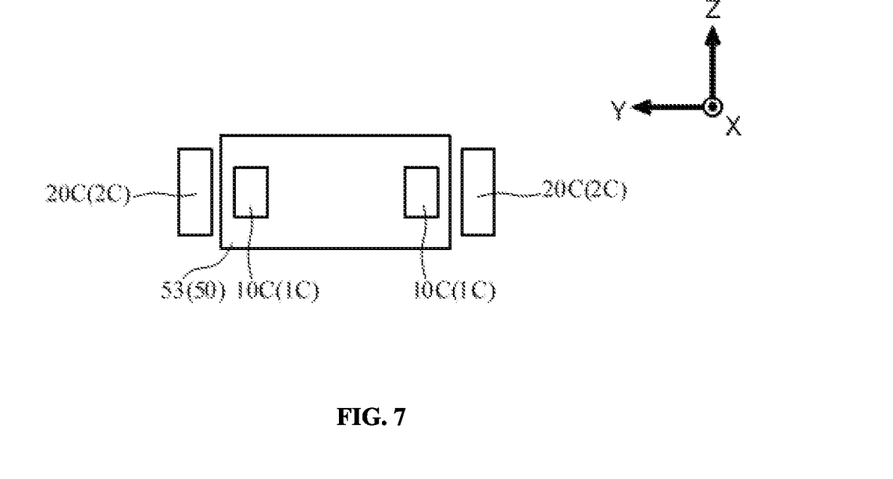
FIG. 7 is a diagram showing the configuration of a first magnet and a second magnet in an optical member driving device according to a fourth embodiment of the present disclosure.

Next, the fourth embodiment of the present disclosure is described. As shown in FIG. 7, in the optical member driving device 9 of the fourth embodiment, one magnet piece 10C of the first magnet 1C and one magnet piece 20C of the second magnet 2C, and the other magnet piece 10C of the first magnet 1C and the other magnet piece 20C of the second magnet 2C are located at positions separated in the Y-direction which is a direction in parallel to the extending direction of the pivot shaft 3, respectively. In other words, the first magnet 1 and the second magnet 2 are arranged in the extending direction of the pivot shaft 3. According to the present embodiment, the movement in the axial direction of the pivoting portion 50 is suppressed by the repulsive force between the magnet piece 10C and the magnet piece 20C. Further, the lengths and the movable ranges of the magnet piece 10C and the magnet piece 20C are set similarly to the third embodiment, so that the movement in the pivoting direction of the pivoting portion 50 is suppressed.

Fifth Embodiment

Figure 8:
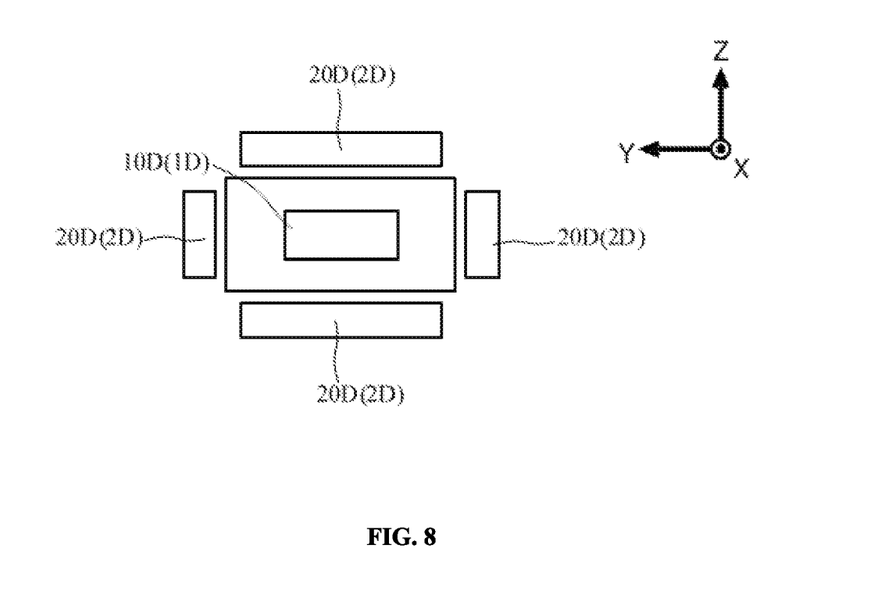
FIG. 8 is a diagram showing the configuration of a first magnet and a second magnet in an optical member driving device according to a fifth embodiment of the present disclosure.

Next, the fifth embodiment of the present disclosure is described. As shown in FIG. 8, in the optical member driving device 9 of the fifth embodiment, the second magnet 2D has four magnet pieces 20D. Then, two of the four magnet pieces 20D of the second magnet 2D are located at positions separated in the Y-direction with respect to the magnet piece 10D of the first magnet 1, and the remaining two magnet pieces 20D are located at positions separated in the X-direction with respect to the magnet piece 10D. In other words, the first magnet 1 and the second magnet 2 are arranged both in the pivoting direction and in the extending direction of the pivot shaft 3. The magnet piece 10D and the magnet piece 20D are disposed in such a way that the same magnetic poles face each other in the pivoting direction and the axial direction. According to the present embodiment, the movement in the direction around the axis of the pivoting portion 50 is suppressed by the repulsive force between the magnet piece 10D and the magnet pieces 20D located at positions separated in the Y-direction, and the movement in the axial direction of the pivoting portion 50 is suppressed by the repulsive force between the magnet piece 10D and the magnet pieces 20D located at positions separated in the X-direction. In adopting such a configuration, the second magnet 2D may be disposed around the first magnet 1D without a gap.

Sixth Embodiment

Figure 9:
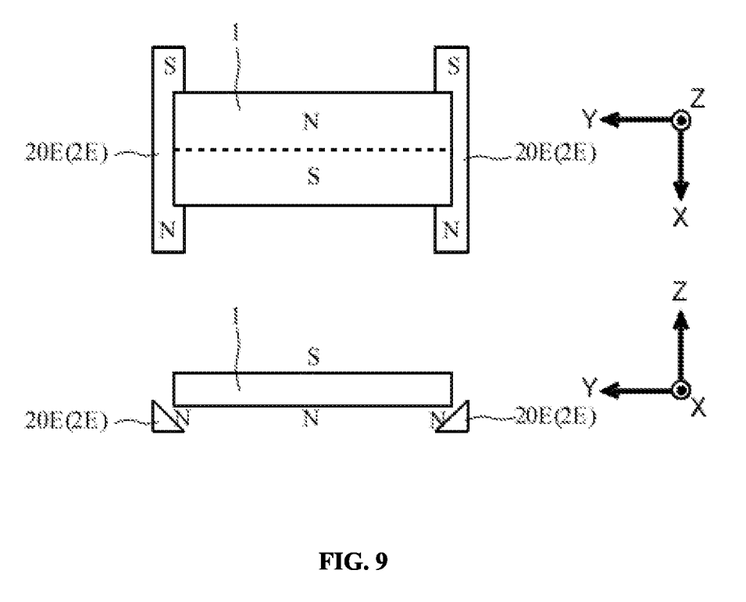
FIG. 9 is a diagram showing the configuration of a first magnet and a second magnet in an optical member driving device according to a sixth embodiment of the present disclosure.

Next, the sixth embodiment of the present disclosure is described. As shown in FIG. 9, in the optical member driving device of the sixth embodiment, a combination of a magnet 1 disposed similarly to the first embodiment and a second magnet 2E disposed similarly to the fourth embodiment is used. However, the second magnet 2 is configured by two right-angled isosceles triangular prism-shaped magnet pieces 20E which have right-angled isosceles triangular cross sections. The surface corresponding to the bottom of the right-angled isosceles triangular shape of the second magnet 2 faces the first magnet 1 from the +Y−Z side and the −Y−Z side. Therefore, it is possible to provide an optical member driving device 9 which can reliably prevent the pivoting portion 50 on which the optical member is mounted from pivoting excessively. Further, even in the axial direction of the pivot shaft 3, even if the pivoting portion 50 moves in the axial direction, the repulsive force similar to the pivoting direction works, so that the pivoting portion 50 is suppressed from moving excessively, and always attempts to maintain the central position in the axial direction.

It is to be noted that, in the second embodiment to the fifth embodiment, the configurations in which the second magnets 2A, 2B, 2C, and 2D surround the first magnets 1A, 1B, 1C, 1D are described, but it may also be a configuration in which the first magnets 1A, 1B, 1C, and 1D surround the second magnets 2A, 2B, 2C, 2D. Further, in all the embodiments from the first through sixth, the pivot shaft 3 was described as extending in the Y-direction. However, it is not limited to that, and in addition to the pivot shaft 3 extending in the Y direction, another driving shaft extending in the Z axial direction may be added.

What is claimed is:

1. An optical member driving device, comprising:
   a fixed portion;
   a pivoting portion with a holding portion for holding the optical member;
   a pivot shaft;
   a driving portion; and
   a pivot suppressing portion,
   wherein the pivot suppressing portion comprises a first magnet provided at the pivoting portion, and a second magnet provided at the fixed portion, the first magnet and the second magnet are disposed in such a manner that the same magnetic poles face each other in a pivoting direction.

2. The optical member driving device according to claim 1, wherein one of the first magnet and the second magnet is disposed with respect to the other one of the first magnet and the second magnet, in such a manner that the same magnetic poles face each other from both sides in the pivoting direction.

3. The optical member driving device according to claim 2, wherein one of the first magnet and the second magnet is disposed with respect to the other one of the first magnet and the second magnet, in such a manner that the same magnetic poles face each other from both sides in an extending direction of the pivot shaft.

4. The optical member driving device according to claim 3, wherein one of the first magnet and the second magnet is disposed with respect to the other one of the first magnet and the second magnet, in such a manner that the same magnetic poles face each other from both sides in a predetermined direction inclined relative to both the pivoting direction and the extending direction of the pivot shaft.

5. The optical member driving device according to claim 4, wherein of the first magnet and the second magnet, the magnet arranged on an outer side has a right-angled isosceles triangular prism shape, and a surface corresponding to a bottom of the right-angled isosceles triangular shape faces the magnet arranged on an inner side.

6. The optical member driving device according to claim 3, wherein the first magnet and the second magnet are arranged in the pivoting direction, of the first magnet and the second magnet, the magnet arranged on an inner side and the magnet disposed on an outer side have different lengths in the extending direction of the pivot shaft, and regardless of movement of the pivoting portion in the extending direction of the pivot shaft, the entire shorter magnet faces the longer magnet.

7. The optical member driving device according to claim 6, wherein the magnets arranged on the inner side comprises two magnets in the arrangement direction, the adjacent magnets arranged on the outer side and the magnets arranged on the inner side face each other, respectively.

8. The optical member driving device according to claim 3, wherein the first magnet and the second magnet are arranged in the extending direction of the pivot shaft, of the first magnet and the second magnet, the magnet arranged on an inner side and the magnet disposed on an outer side have different lengths in the pivoting direction, and regardless of movement of the pivoting portion in the pivoting direction, the entire shorter magnet faces the longer magnet.

9. The optical member driving device according to claim 8, wherein the magnets arranged on the inner side comprises two magnets in the arrangement direction, the adjacent magnets arranged on the outer side and the magnets arranged on the inner side face each other, respectively.

10. The optical member driving device according to claim 1, further comprising a coil, wherein the first magnet also serves as a driving magnet that generates a driving force of the pivoting portion together with the coil.

11. A camera device comprising the optical member driving device according to claim 1.

12. An electronic apparatus comprising the camera device according to claim 11.

* * * * *